(12) United States Patent
Brubaker et al.

(10) Patent No.: US 7,027,285 B2
(45) Date of Patent: Apr. 11, 2006

(54) VENTED CAPACITOR

(75) Inventors: Michael Allen Brubaker, Loveland, CO (US); Terry Alan Hosking, Barre, VT (US)

(73) Assignee: Field Metrics, Inc., Seminole, FL (US)

( * ) Notice: Subject to any disclaimer, the term of this patent is extended or adjusted under 35 U.S.C. 154(b) by 0 days.

(21) Appl. No.: 10/905,352

(22) Filed: Dec. 29, 2004

(65) Prior Publication Data

US 2005/0157446 A1   Jul. 21, 2005

Related U.S. Application Data

(60) Provisional application No. 60/481,905, filed on Jan. 16, 2004.

(51) Int. Cl.
*H01G 4/00* (2006.01)

(52) U.S. Cl. .............. 361/301.3; 361/301.5; 361/329

(58) Field of Classification Search ......... 361/301.3, 361/301.4, 301.5, 309, 311–312, 321.2
See application file for complete search history.

(56) References Cited

U.S. PATENT DOCUMENTS

| 4,259,708 | A | * | 3/1981 | Mandelcorn | ............... 361/318 |
| 4,348,712 | A | * | 9/1982 | Newcomb | .................. 361/315 |
| 4,670,814 | A | | 6/1987 | Matsui et al. | ............ 361/274.3 |
| 4,992,910 | A | | 2/1991 | Evans | ........................ 361/502 |
| 5,400,211 | A | * | 3/1995 | Evans | ........................ 361/502 |
| 5,608,600 | A | | 3/1997 | Lavene | ..................... 361/303 |
| 5,610,796 | A | | 3/1997 | Lavene | ..................... 361/303 |
| 5,614,111 | A | | 3/1997 | Lavene | ................. 219/121.59 |
| 6,442,014 | B1 | * | 8/2002 | Lin | ........................ 361/301.3 |
| 6,687,115 | B1 | | 2/2004 | Carter | ....................... 361/323 |

* cited by examiner

*Primary Examiner*—Anthony Dinkins

(57) ABSTRACT

A technique of increasing the corona inception voltage (CIV), and thereby increasing the operating voltage, of film/foil capacitors is described. Intentional venting of the capacitor encapsulation improves the corona inception voltage by allowing internal voids to equilibrate with the ambient environment.

7 Claims, 2 Drawing Sheets

VENTED CAPACITOR

CROSS REFERENCE TO PRIOR APPLICATION

This application claims the priority of U.S. Provisional Application Ser. No. 60/481,905 filed Jan. 16, 2004 and entitled "VENTED CAPACITOR", the subject matter of which is incorporated herein by reference.

FEDERAL GOVERNMENT RESEARCH STATEMENT

This invention was made with Government support under contract DE-FG03-01ER83228 awarded by the Department of Energy. The Government has certain rights to this invention.

FIELD OF THE INVENTION

The present invention relates to a method of improving the corona inception voltage of polymeric film/foil capacitors.

DESCRIPTION OF THE PRIOR ART

Polymeric film/foil capacitors with a small form factor for alternating current (AC) applications are presently limited to continuous operating voltages of 900 VAC rms. This limit is largely due to the corona inception voltage (CIV) of the capacitor, which defines the voltage level where internal discharges occur. Operating above the CIV will reduce the capacitor life span as discharges gradually degrade the dielectric structure. This is a particularly important issue when operating the capacitor at high AC frequencies, such as those that might occur in an electronic fluorescent light ballast or a switching power supply.

A variety of polymer film capacitor designs are known in the art, and several techniques to improve their CIV or voltage withstand capability have been reported. For example, Shaw and Yializis disclose in U.S. Pat. No. 4,320,437, issued Mar. 16, 1982, a polymeric capacitor with improved dielectric strength comprised of alternate strips of polypropylene and aluminum foil with narrow bands of a dielectric coating along the longitudinal edges of the aluminum strips. The coated edges may also be folded to improve dielectric performance of the capacitor. The method requires substantial changes to the manufacturing processes currently used to make the highest performance capacitors. These changes can cause the loss of other capacitor properties, such as self-healing, low cost and the sensitivity of capacitor properties to material tolerances.

Damage to polymeric films is caused by the simultaneous presence of electrical discharges and oxygen at the polymer film surface. The combination causes deleterious permanent damage to the polymer film, resulting in loss of capacitance and/or increased conductivity between the capacitor electrodes. The use of insulating fluids such as mineral oil or inert gas is a commonly known method of expelling oxygen from regions near the polymer film in the capacitor, resulting in a more stable capacitance value. Shedigian describes in U.S. Pat. No. 4,456,945, issued Jun. 26, 1984, the use of polypropylene and polyethylene teraphthalate films in a wound film capacitor. Polyethylene teraphthalate (PET) film is easily wetted by dielectric oil, whereas polypropylene does not easily wet. The PET film enhances the ability of the insulating oil to fill interstices that would otherwise remain unfilled. The result is a capacitor with an improved voltage rating. However, the disclosed method requires substantial changes to the manufacturing process, and the introduction of two insulating films, which can reduce the ability of the capacitor to self-heal when a local electrical short occurs in one of the polymer films.

Lavene discloses in U.S. Pat. No. 5,614,111, issued Mar. 25, 1997, in U.S. Pat. No. 5,610,796, issued Mar. 11, 1997 and in U.S. Pat. No. 5,608,600, issued Mar. 4, 1997, the use of thinner metallization on polymer films to improve the dielectric breakdown strength of a metallized capacitor. The method actually does not improve the dielectric strength of the film, but instead provides a fuse mechanism to automatically remove regions of the polymer film containing manufacturing defects. The metallization is sufficiently thin that a short circuit current through a defect in the polymer film will cause the metallization to vaporize, disconnecting the shorted polymer region from the remaining capacitor structure. The result is a capacitor that can operate at higher applied voltages because defects that normally destroy the capacitor are instead isolated from the capacitor, leaving a polymer film that has a lower defect density. The use of thinner metallization causes the capacitor to have higher resistive losses, which can cause excessive heating when large surge currents pass through the capacitor electrodes. Thin metallization is also more easily damaged during manufacturing, and is more easily ruptured during thermal cycling of the finished capacitor.

Matsui et al. disclose in U.S. Pat. No. 4,670,814, issued Jun. 2, 1987, the use of an impregnation resin around capacitor elements and including a plurality of air ducts to improve heat removal from the capacitor elements. This patent does not discuss any improvements in dielectric breakdown strength or capacitor operating voltage.

Evans discloses in U.S. Pat. No. 5,400,211, issued Mar. 21, 1995, and in U.S. Pat. No. 4,992,910, issued Feb. 12, 1991, a packaging material that is permeable to gases generated in the packaged device, but impermeable to functional liquids in the package. The example given is a capacitor containing a liquid electrolyte that must remain contained in the package, while at the same time allowing the release of gases formed by the capacitor during normal operation. This approach does not indicate an improved capacitor voltage rating using the technique, and specifically discusses the release of gases formed inside the package, rather than the introduction of external gases into the package.

Carter discloses in U.S. Pat. No. 6,687,115, issued Feb. 3, 2004, a process to improve the high temperature operation of a metallized polypropylene capacitor, by placing the capacitor in a vacuum chamber and heating slowly to a temperature above the shrinkage temperature of polypropylene, typically 135–140 degrees C., for one or more hours. This causes the voids between adjacent layers of film to be reduced, which improves thermal stability and improves voltage withstand capability. However, the metallization of polypropylene film capacitors becomes fractured as the polypropylene is heated above its shrinkage temperature, resulting in long term reliability issues, particularly when operating with alternating polarity voltages applied to the device.

All of the cited prior art fails to make dramatic improvements in the corona inception voltage of wound polymer film/foil capacitors while retaining all of the other desirable properties of polypropylene film/foil capacitors. There is a need for a means to improve the CIV and hence the maximum continuous AC operating voltage of a standard polypropylene film/foil capacitor for AC applications. The method should be cost effective while retaining all of the advantageous properties of polypropylene film/foil capacitors, including stable dielectric constant over temperature and time, high temperature operation of >125 degrees C., high dV/dt capability, high surge current capability, low electrical loss, high electrical resistance and self-healing after experiencing a localized short circuit across the polymer film.

SUMMARY OF THE PRESENT INVENTION

It is an object of the present invention to improve the corona inception voltage of a standard polypropylene film/foil capacitor that is cost effective, and retains all of the advantageous properties of polypropylene film/foil capacitors, including high temperature operation of >125 degrees C., high dV/dt capability, high surge current capability, low electrical loss, high electrical resistance and self-healing after experiencing a localized short circuit across the polymer film.

Briefly, a standard polypropylene film/foil capacitor has at least one hole placed in the otherwise impermeable encapsulating housing to permit the transfer of gas between the external environment and the interior of the capacitor. The hole is advantageously deployed near a porous end electrode to permit the passing of gases between the interior and the exterior of the capacitor, while minimizing any damage to the delicate windings of the capacitor body.

An advantage of the present invention is that no changes in the manufacturing processes of a conventional polypropylene film/foil capacitor are needed.

Another advantage of the present invention is that the partial vacuum created in the capacitor during manufacture is easily removed, resulting in an increased level of the corona inception voltage.

Another advantage of the present invention is that the region containing the polypropylene film/foil windings is not compromised by the added hole.

Another advantage of the present invention is that no special materials are required to implement the invention.

Another advantage of the present invention is that an insulating gas can be introduced into the capacitor after manufacturing is complete, by mounting the finished capacitor into a container in which the insulating gas is contained.

Another advantage of the present invention is that the disclosed method can be applied after the capacitor has been manufactured and has passed preliminary quality control tests.

Another advantage of the present invention is that the corona inception voltage of a conventional polypropylene film/foil capacitor can be increased by up to 25% using a single hole and dry air as an insulating gas.

Another advantage of the present invention is that the hole required is small, leaving the mechanical package otherwise intact to protect the capacitor windings.

DETAILED DESCRIPTION OF THE PREFERRED EMBODIMENTS

Figure 1:
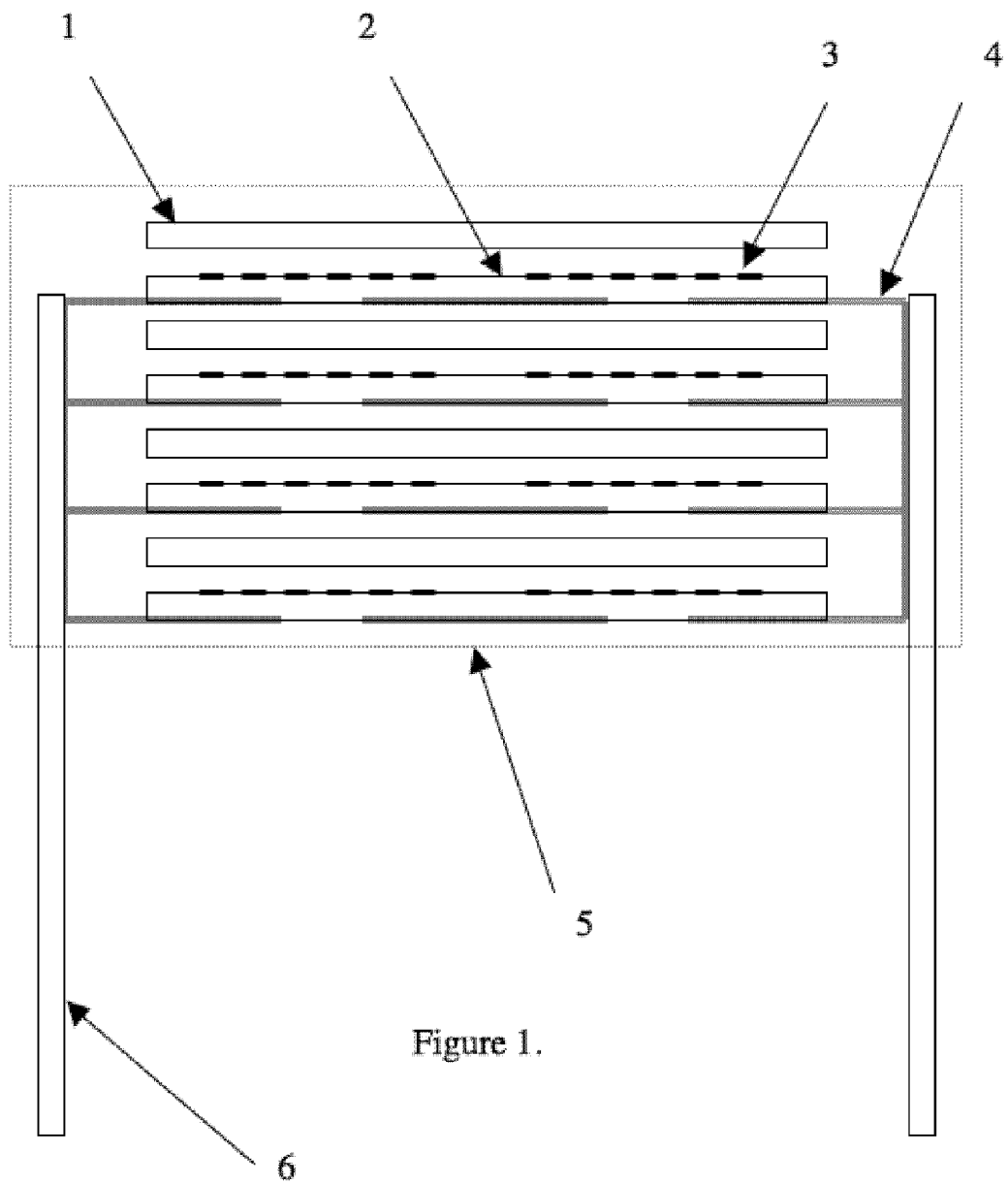
FIG. 1 is a schematic diagram showing the cross section of a film/foil capacitor.

The film/foil capacitor is comprised of two foil electrodes separated by a layer of dielectric film. High capacitance values can be realized by winding multiple layers on a mandrel to increase the surface area. The operating voltage is defined by the dielectric strength of the film and higher voltage parts may be fabricated by placing multiple capacitor "sections" in series. In this implementation, thin electrodes are deposited on the film to provide coupling between sections. A typical four-section capacitor for electronic ballast applications is illustrated in FIG. 1. Metallization 3 is applied to dielectric film 2 and wrapped with a metal foil 4 and unmetallized dielectric film 1. After winding, leads 6 are welded to the end foils and the part is encapsulated in epoxy 5. The epoxy encapsulation provides both mechanical strength and electrical insulation between the capacitor windings and the external environment.

At sufficiently high voltage, corona will occur at the foil edges where the electric fields are enhanced. Due to the thickness differences between the foil and film, small voids are present near the foil edges. The dielectric properties of these void regions thus play a significant role in defining the corona inception voltage (CIV) for the capacitor. This parameter may also be described as the partial discharge inception voltage. During normal manufacturing, the voids are typically filled with atmospheric air and the epoxy encapsulation isolates the internal voids from the outside environment. The CIV is thus subject to such variables as barometric pressure and humidity during the manufacturing process. Furthermore, hot air trapped in the parts during the high temperature encapsulation process will cool afterward, resulting in lower internal pressure and reduced CIV.

Figure 2:
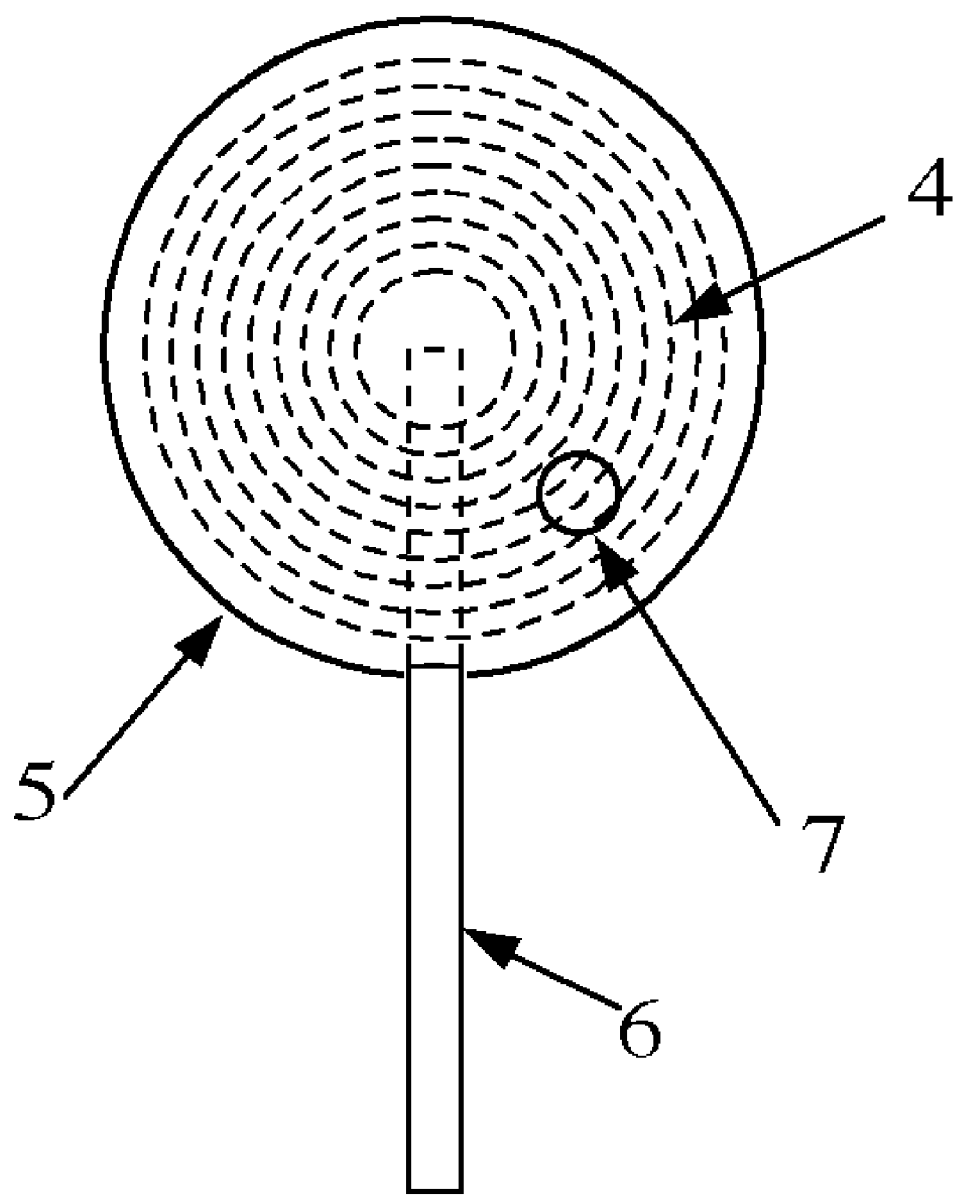
FIG. 2 is a schematic diagram showing the end view of the exterior of a film/foil capacitor with a venting hole.

Intentional venting of the capacitor encapsulation has been demonstrated to improve the CIV by allowing the internal voids to equilibrate with ambient pressure after manufacturing. One possible embodiment is drilling a single hole 7 in the capacitor end face as shown in FIG. 2. Note that the hole is offset from the centerline to avoid damaging the lead 6. The hole can be formed using a variety of techniques known to a manufacturer skilled in the art. For example, a carbide drill bit can be used to machine a hole in the epoxy coating. The depth of the hole is controlled so that the epoxy coating is penetrated, but damage to the underlying welded metal layer is minimized. The weld region must be at least partially porous to allow the transfer of gases through the hole and through the metal weld into the capacitor winding interstices.

The disclosed invention has been reduced to practice in the following sense. A batch of 15 nF film/foil capacitors was fabricated using polypropylene as the dielectric film. The capacitor design has a nominal rating of 900 VAC for continuous use, indicating that the CIV is normally higher than 1000 VAC. A partial discharge measurement system was used to monitor the AC voltage for the onset of Corona in each capacitor. The average CIV was 1100 VAC when measured with a sinusoidal voltage at 60 Hz. Each capacitor had one vent hole drilled in one end of the epoxy encapsulation. The hole was approximately one-eighth inch in diameter, and sufficiently deep to penetrate the epoxy coating. When the CIV was again measured for the same set of capacitors, the average value of the CIV had increased to 1200 VAC.

A vented capacitor was then mounted in a sealed pressure vessel that allows simultaneous measurement of the CIV while the capacitor environment is pressurized or evacuated.

When the capacitor environment was pressurized to 15 pounds per square inch gauge with dry nitrogen gas, the CIV was demonstrated to increase by more than 20% from the value at ambient pressure. The time constant for these changes to occur was on the order of a few minutes, indicating that the transfer of the surrounding pressure into the capacitor windings was rapid and enabled by the presence of the vent hole.

The vented capacitor can realize further CIV improvements by operating in a controlled environment. For example, the vented capacitor can be placed in a vessel that is vacuum processed and filled with air, nitrogen or Sulfur Hexafluoride, which will impregnate the internal voids. Sulfur Hexafluoride provides a factor-of-three higher dielectric strength than nitrogen gas. Increasing the pressure of the gas will further improve the CIV of the capacitor, since higher pressure results in a higher dielectric strength for gases such as air, nitrogen or Sulfur Hexafluoride. Similar improvements can be achieved using liquid dielectrics such mineral or silicone oil.

What is claimed is:

1. A capacitor with an improved Corona inception voltage comprised of a single section or multi-section film/foil capacitor comprised of alternating layers of plastic film and metal foil formed into a winding, an electrical terminal fastened to each end of the capacitor winding, and a hermetic coating encasing the capacitor winding; where one or more vent holes are formed in the hermetic coating material to intentionally allow the transfer of gases into the winding; and where the one or more vent holes are not sealed while using the capacitor.

2. The device in claim 1 where one or more vent holes are formed on the capacitor end face offset to one side of one or more electrical terminals.

3. The device in claim 1 where the vent hole or holes allow the gas in the capacitor winding to equilibrate with the outside gas environment in a time period of less than one day, and more preferably less than one hour.

4. The device in claim 1 where the corona inception voltage (CIV) is increased such that the capacitor can operate safely at higher applied voltages without any loss of service life by enabling ambient gas to enter the part and eliminate low-pressure regions created during the manufacturing process.

5. The device in claim 1 where the corona inception voltage (CIV) is increased such that the capacitor can operate safely at higher applied voltages without any loss of service life by operating the capacitor in an insulating gas at atmospheric pressure, including but not limited to air, nitrogen or Sulfur Hexafluoride.

6. The device in claim 1 where the corona inception voltage (CIV) is increased such that the capacitor can operate safely at higher applied voltages without any loss of service life by operating the capacitor in an insulating gas at higher than atmospheric pressure, including but not limited to air, nitrogen or Sulfur Hexafluoride.

7. The device in claim 1 where the electrical connections to the metallization or metallic foil comprising the capacitor winding are made gas permeable to permit passage of gas into the capacitor winding.

* * * * *

UNITED STATES PATENT AND TRADEMARK OFFICE
CERTIFICATE OF CORRECTION

PATENT NO. : 7,027,285 B2  Page 1 of 1
APPLICATION NO. : 10/905352
DATED : April 11, 2006
INVENTOR(S) : Brubaker and Hosking It is certified that error appears in the above-identified patent and that said Letters Patent is hereby corrected as shown below:

On The Title Page: Item (54) Inventors should include Christopher Paul Yakymyshyn; Seminole, FL.

Signed and Sealed this

Fifth Day of June, 2007

JON W. DUDAS
*Director of the United States Patent and Trademark Office*